(No Model.)

H. ROHRER.
WAGON TIRE.

No. 460,184. Patented Sept. 29, 1891.

Witnesses.
W. E. Reid
H. H. Palmer Jr.

Inventor.
Henry Rohrer

UNITED STATES PATENT OFFICE.

HENRY ROHRER, OF SAN DIEGO, CALIFORNIA.

WAGON-TIRE.

SPECIFICATION forming part of Letters Patent No. 460,184, dated September 29, 1891.

Application filed June 12, 1889. Serial No. 314,071. (No model.)

*To all whom it may concern:*

Be it known that I, HENRY ROHRER, a citizen of the United States, residing in the city of San Diego, in the county of San Diego and State of California, have invented certain new and useful Improvements in Wagon, Carriage, and Buggy Tires and Tires for the Wheels of other Roadway Vehicles, of which the following is a specification.

The objects of my invention are to, first, supersede or do away with the rivets, bolts, and nails commonly used in attaching the tires to the wheels; second, to dispense with the perforation of wagon-fellies and the fellies of other vehicle-wheels, and to thereby secure greater strength and durability in such fellies; third, to provide a cheaper and more durable wagon-tire than those now commonly used.

Figure 1:
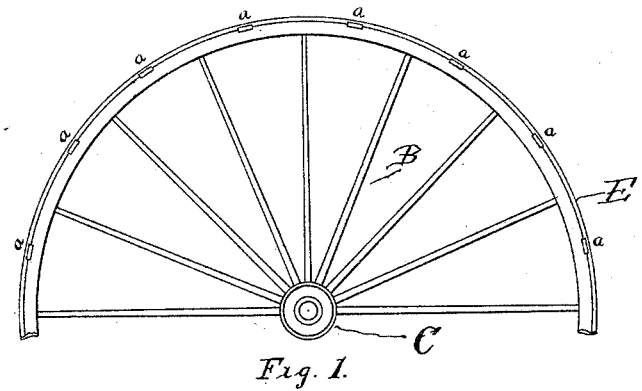
Figure 2:
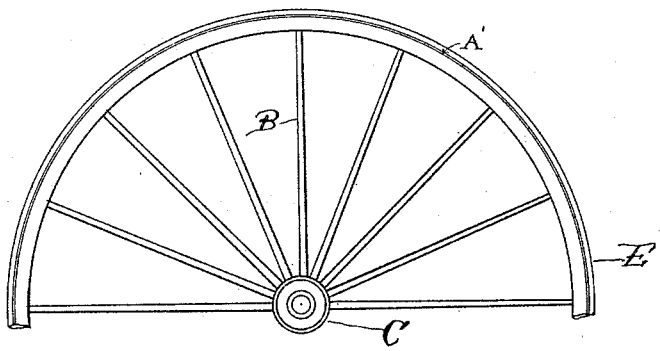
Figure 3:
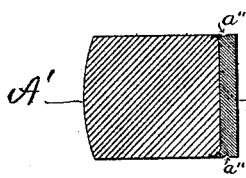
Figure 4:
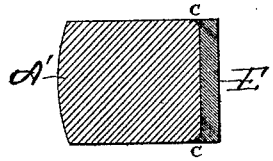
Figure 5:
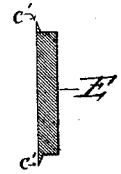

In the drawings, Figure 1 is a side elevation of a portion of a vehicle-wheel provided with my improved tire, showing the lips or projections on the edges of the tire pressed or forced into the side faces of the fellies. Fig. 2 is a side elevation of a portion of the vehicle-wheel having an ordinary tire. Figs. 3 and 4 are detail sectional views of the felly having the lipped tire, and Fig. 5 is a sectional view of the lipped tire detached from the felly.

The invention relates to wagon-tires and the like; and it consists in the construction and novel combination of parts, as herein described and claimed.

Referring by letter to the accompanying drawings, A' designates the felly of a vehicle-wheel, which is of the usual or ordinary construction.

B are the spokes, and C the hub of the same.

E is the tire, which in this instance is provided on each side or edge with a number of pointed or tapered lips or projections $c\ c'$ at the points $a\ a'$, &c., about midway between the spokes of the wheel. These lips or projections $c\ c'$ are bent in the direction of the hub of the wheel and are forced into the material of the felly, so as to clinch the same and thereby prevent all possibility of lateral movement of the tire upon the felly, which will in the ordinary constructions of this class of wheels permit the slipping of the tire from place when the felly becomes shrunken in dry weather and from long exposure and use. By means of these lips or projections a very substantial wheel is provided, and its usefulness is greatly prolonged at a very trifling increase of expenditure.

I am aware that a vehicle-wheel has been provided prior to my invention with a tire having at each edge a continuous flange projecting inwardly therefrom in the direction of the hub of the wheel, and I am also aware that a car-wheel consisting of a center having two projecting edges, one of which is irregular or recessed, and a steel tire having webs fitting over the edges of said center, portions of one of said webs being bent down into said recesses, have been used prior to my invention, and I make no claim to either of said constructions herein.

Having thus fully described my invention, what I claim as new, and desire to secure by Letters Patent, is—

The combination, with the felly of a roadway vehicle-wheel, of the tire for said wheel, having upon its opposite edges at intervals and in line with its inner periphery a number of integral pointed and tapered clinching lips or projections bent inwardly and forced into the wood of the felly at the sides of the same, substantially as and for the purpose specified.

HENRY ROHRER.

Witnesses:
W. E. REID,
H. H. PALMER, Jr.